United States Patent
Haug

(10) Patent No.: US 7,962,241 B2
(45) Date of Patent: Jun. 14, 2011

(54) METHOD FOR SHIPPING OBJECTS

(75) Inventor: Thomas Peter Haug, Langnau im Emmental (CH)

(73) Assignee: Frama AG, Lauperswil (CH)

( * ) Notice: Subject to any disclaimer, the term of this patent is extended or adjusted under 35 U.S.C. 154(b) by 811 days.

(21) Appl. No.: 11/973,004

(22) Filed: Oct. 4, 2007

(65) Prior Publication Data

US 2008/0133050 A1    Jun. 5, 2008

(30) Foreign Application Priority Data

Oct. 8, 2006 (EP) .................................... 06405431

(51) Int. Cl.
G06F 7/00 (2006.01)
G06F 17/00 (2006.01)
G07B 17/02 (2006.01)

(52) U.S. Cl. .................... 700/227; 705/404; 705/408
(58) Field of Classification Search .................. None
See application file for complete search history.

(56) References Cited

U.S. PATENT DOCUMENTS

| | | | |
|---|---|---|---|
| 6,035,291 A | 3/2000 | Thiel | |
| 2002/0046194 A1 | 4/2002 | Gelfer | |
| 2005/0209978 A1* | 9/2005 | Bleumer | 705/404 |
| 2006/0173798 A1 | 8/2006 | Charroppin | |

FOREIGN PATENT DOCUMENTS

| | | |
|---|---|---|
| EP | 1 439 496 | 7/2004 |
| EP | 1 622 091 | 2/2006 |
| GB | 2 410 461 | 8/2005 |

* cited by examiner

*Primary Examiner* — Gene Crawford
*Assistant Examiner* — Yolanda Cumbess
(74) *Attorney, Agent, or Firm* — Lucas & Mercanti, LLP; Klaus P. Stoffel

(57) ABSTRACT

A method and a system for shipping objects and/or goods which are transferred from a drop-off point (4) constructed as an organized franking system for the application of at least partially coded labels to a delivery service (7-10) for transport of the objects to a remote destination, wherein the delivery or transport of the objects is determined or handled by the franking system or franking machine (3), which is equipped with control functions. In the system for shipping objects and/or goods, which are provided with at least partially coded labels and are sent from a drop-off point (4) equipped with a franking machine (3) to a remote destination by a delivery service (7-10), the franking machine (3) can be connected to an information system (6) which processes the data of a delivery service (7-10) and generates shipping data for the franking machine (3), so that the shipping order can be handled.

13 Claims, 1 Drawing Sheet

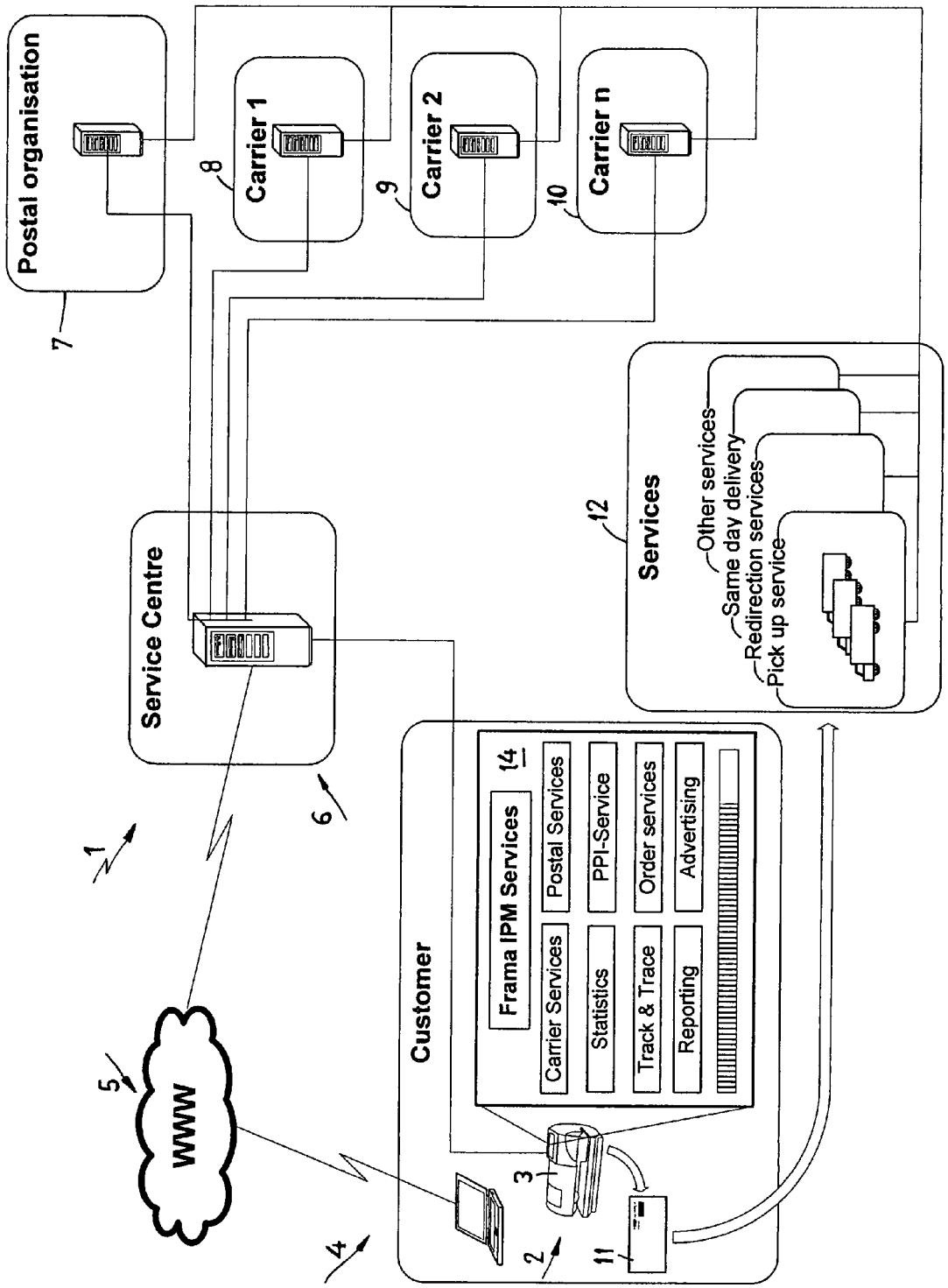

METHOD FOR SHIPPING OBJECTS

BACKGROUND OF THE INVENTION

1. Field of the Invention

The present invention relates to a method for shipping objects or goods which are transferred from a drop-off point designed as a franking system for the application of at least partially coded labels to a delivery service for transport of the objects to a remote destination.

The invention also relates to a system for shipping objects and/or goods with means of communication and means of transportation for shipping objects from a drop-off point equipped with a franking system or a franking machine by means of at least one hired delivery service to a destination remote from the drop-off point.

2. Description of the Related Art

The shipping of objects from a drop-off point to a remote destination has occurred in the past, for example, along known shipping or transport routes from the drop-off point through the agency of an official or national post office or of a suitable carrier by the use of available means of transportation. Use can also be made of several intermediate and/or transfer stations or carriers, where the drop-off point can be equipped with a franking system or a franking machine to prepare the object for shipping. At the drop-off point, the objects or goods to be shipped, which can be letters, envelopes, cards, packages, or cartons, are appropriately franked or provided with postage value symbols and/or made partially ready to ship according to their destination, format, and/or weight. Then the objects to be shipped are brought by the drop-off point's own means of transportation or by outside means to the nearest post office or carrier, where the objects to be shipped, provided with the value symbols covering the cost of transport and delivery and/or with the shipping forms, are then handed over to the transportation, shipping, or delivery service. The transport, shipping, or delivery service then charges the post office or shipping office the postage or shipping fees corresponding to the transport and delivery services performed.

In the case of another known shipping principle, the objects to be shipped are prepared for shipping, including franking, in the form of partially coded labels according to destination, format, and/or weight at the drop-off point by the drop-off point's own means. Then an order is issued, and the objects are picked up by a courier service and transferred by that service from the drop-off point or preparation site to a first destination or way station. The courier service in this case plays the role of general contractor, and available means of communication and transportation are used. When the courier service accepts a shipping order, the shipper of the object is given forms (preprinted forms), which have been prepared by the courier service and which must be filled out in advance, and various other items. These forms and items require a relatively large amount of bureaucratic and manual processing and are not processed by the use of available means of modern communication.

The known company UPS accepts shipping orders and makes preprinted forms available to the customer via the Internet, which can be processed on-screen. The customer enters the appropriate data, i.e., information identifying the customer, the type of object to be shipped, its destination, and the name and address of the recipient. The customer prepares the object for shipping, possibly also with the help of UPS, which will then pick up the object. The further course of the delivery process remains under the supervision and/or control of UPS.

Such procedures for the shipping of objects are seen to be cumbersome and awkward with respect to the preparation of the objects for shipping and the overall execution of the process, and, because of multiple transfer stations between the drop-off point and the destination, the objects can be tracked only with considerable difficulty and/or only with a large amount of labor and expense. Hardly any use is made of technically advanced means of communication. The known procedures stand in the way of the economic and reliable realization of a shipping method.

SUMMARY OF THE INVENTION

The object of the invention is therefore to propose a method and a system for the shipping of objects, which, with the use of franking systems or franking machines, makes it possible to realize a simplified shipping principle with reduced need for manual labor and administration.

The invention takes a new route, in that, in a method of the type described above, the delivery or transport of objects is controlled and/or handled by way of a franking system equipped with control functions.

Thus the shipping customer and/or in a more user-friendly, more comprehensive and can be controlled and monitored by a central office or by the drop-off point all the way to the destination by means of so-called track-and-trace information. The drop-off point is, accordingly, designed to optimize the times and rates for the shipping of goods.

As a result, the instantaneous location of a shipping object can be determined and tracked; costs can be controlled; and the shipping order can be billed by one office or one drop-off point, which does not necessarily have to be the site of the franking system. Thus the benefit of a franking system can be considerably expanded; a wider area of communications is created and intensified and/or canvassed; connections and commerce can be improved; and costs can be determined and calculated more exactly for budgeting. Finally, greater reliability and simplification is achieved for the shipping of objects by means of this system and/or by the franking system used.

Barcodes or programmable chips such as RFID (radio frequency ID) chips with memory capacity can be used for the at least partially encoded labeling of the objects and/or goods to be shipped. Chips can also be glued onto the objects.

Once the identification is applied, the drop-off point of the object is automatically identified.

The drop-off point is characterized among other things by the presence of a franking system connected to the Internet.

Between the drop-off point and the delivery service, it would be possible to use a pickup service such as courier service, of which the delivery service makes use, for the objects and/or goods to be shipped.

The system also allows the possibility of combining several companies into a joint arrangement.

Contributing significantly to this end is an information system, which can be added to the franking system or is connected to it, and which functions at least to generate information from the data of the delivery service and to transmit or transfer them to the franking system. The connection between the franking system and the information system can be established on the basis of an identification number or license number issued by, for example, the information system for the franking system.

The information system, designed as a data processing and control center, makes optimized data or rules of data acquisition available to the delivery services. These data or rules can be called up and/or made available via the franking system and can be used to control the shipping method. For this reason, the information system is equipped with a computing-capable control and inquiry program and is connected for the purpose of data transmission to the franking system and to the delivery services and/or to other service-providing companies participating in the shipping of the objects and/or goods.

It is advisable for delivery service data which can be called up from a single location such as the drop-off point to prepare, to specify, and/or to initiate and to complete the handling of the shipment of an object to be transmitted from the franking machine or from the drop-off point to the information system via the data communications lines.

It has been found advantageous for it to be possible to transmit and/or to exchange the data between the franking system, the information system, and/or the delivery services over a connections line in a unidirectional or bi-directional manner.

To optimize the use of computing-capable data processing systems, it has been found advisable for the information and/or franking system to have the ability to revise and/or to correct the data transmitted from the information system to the franking system and vice versa.

The information system is advisably equipped with a computing-capable electronic control program, by which data can be processed, called up, generated, and transmitted to the franking system and/or to a computer system of one or more delivery services.

To create the label or stamp which accompanies the shipping object, data available in the information system or data which can be generated or made available by that system for shipping can be requested, received, and processed by the franking system for the shipping of letters, packages, and goods on the basis of a shipping order.

It is preferable to provide the possibility of transmitting or exchanging data between the franking system and a delivery service.

To guarantee the continuous handling of a shipping order, it is advantageous for the delivery service to be equipped with a pickup or feeder service to pick up the objects to be shipped at the drop-off point or for this purpose to use an available (regional) courier service with a motor pool.

So that the information system can be expanded and utilized economically, it can be connected to several franking systems.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:
The single FIGURE of the drawing shows a diagram of an inventive method and a corresponding system for handling the shipping of objects by means of a franking system.

DESCRIPTION OF THE PREFERRED EMBODIMENTS

The single FIGURE shows a composite network for the shipping of objects such as letters, documents, etc., and/or packages, for communications, and for worldwide commerce with goods of all types.

The starting point can be an installed franking system 2 with a franking machine 3. This is integrated into a drop-off point 4, possibly attended by personnel, but it can also be outside such a location, in which the printed matter, letters, merchandise, objects, and/or goods to be shipped are prepared and made ready for shipping. The franking system has its own Internet interface 5 or a telephone or communications connection available, by means of which the franking system is connected or linked on-line via a line 12 to an information system 6 designed as a data processing and control system. The information system 6 is connected in turn to several delivery services 7-10, which offer services for the shipping of goods and a choice of transport alternatives, rates for calculation and billing of the services, and which preferably have a pickup service 12 for picking up objects 11 and taking them to the drop-off point 4.

Via the connection with the information system 6, shipping and/or freight costs can be generated from the data and information obtained from one or more delivery services and transmitted to the franking system, where they can be compared with each other and used to calculate and to determine the total shipping costs for a shipping order to be handled.

For this purpose, there is an on-line connection or a connection which can be established between the franking system, the information system, and the delivery services. Of course, appropriately networked computers are installed at the stations in question, from which shipping or transport data can be called up.

As a result, it is possible, at the drop-off point and/or by the franking system, to determine the type of shipping and the means to be used, to calculate the costs, to compare them, and later to bill them, i.e., the costs which will be or have been incurred through transport from the drop-off point to the intended destination.

It is advantageous for the franking system to have a computer, so that it is possible to call up information or data from the information system by means of an interface, including via the Internet.

In a franking machine 3 of the shipping system, the identification and destination data required for shipping are recorded from the shipping orders arriving at the drop-off point. Then, an order number or tracking number is assigned to the shipping order by the information system or information device. This number makes it possible to monitor the progress of the order along its shipping route.

A display or screen 14 of the franking machine 3 is designed as a graphic user guide, equipped with a keyboard, mouse, or touch screen, so that a shipping order can be processed organizationally by the franking system all the way from the drop-off point to the destination on the basis of data or information which can be called up from the information system.

For this purpose, the screen of the franking machine can display an operating menu, via which "track & trace" information, shipping information, order confirmations, bulletins from the delivery services, billing records, etc., which have been generated by and stored in the information system, can be called up. The single FIGURE shows various possible uses by way of example in a separate field.

The progress of the shipping order remains monitored and tracked all the way to the destination, and the location of the object at the moment in question can be determined by means of the franking system on the basis of return messages arriving via the information system. The checking of the location does not necessarily have to be done at the drop-off point, because the information system can be accessed, for example, via the franking system by means of the corresponding tracking number from some other remote location. By means of the proposed shipping system, a letter from a Swiss drop-off point to a destination in Japan can be tracked from a properly equipped customs office at the Zurich Airport, during the flight to the specified airport in Japan, during transport by rail to the main and secondary distribution centers, and finally to the addressee in Japan, and all of this can be confirmed by return messages.

While specific embodiments of the invention have been described in detail to illustrate the inventive principles, it will be understood that the invention may be embodied otherwise without departing from such principles.

I claim:

1. A method for shipping objects and/or goods which are transferred from a drop-off point comprised of a franking system for the application of at least partially coded labels to at least one delivery service for transporting the objects to a remote destination, further comprising determining or handling the delivery or transport of the objects by the franking system, wherein the franking system is equipped with control functions, wherein the shipping or the delivery of the objects takes place via the franking system using data from an information system, the method further including connecting the information system, which is comprised of a processing and control system for generating, storing, and transmitting data for the shipping of objects and/or goods and connected to at least one delivery service, to the franking system and/or connecting the franking system to the information system, initiating or handling the delivery of the objects from the drop-off point by the franking system, wherein the franking system is connected directly or indirectly to the at least one delivery service, and hiring a delivery service selected by the franking system for handling delivery of an object.

2. The method according to claim 1, comprising assigning a tracking number tied to the delivery service to a shipping order.

3. The method according to claim 2, comprising assigning the tracking number by the information system to the shipping order.

4. The method according to claim 1, comprising providing a pickup or feeder service for the objects and/or goods between the drop-off point and the delivery service.

5. The method according to claim 1, comprising connecting the franking system to the information system via the Internet.

6. The method according to claim 1, comprising transmitting delivery service data which can be called up by the franking system to the information system over data lines.

7. The method according to claim 6, comprising transmitting data of several delivery services to the franking system or a franking machine for comparison and/or calling up the data by the franking system.

8. The method according to claim 1, comprising transmitting and exchanging the data between the franking system and a delivery service.

9. The method according to claim 1, comprising equipping a delivery service with a pickup service for picking up the objects to be shipped at the drop-off point, or taking the object to be shipped by a courier service from the drop-off point to the delivery service.

10. The method according to claim 1, comprising connecting several franking systems to one information system.

11. A system for shipping objects and/or goods provided with at least partially coded labels, the system comprising a franking machine (3) of a drop-off point (4) for sending the object to a remote destination by means of at least one authorized delivery service (7-10), wherein, for handling the shipping order, the franking machine (3) is connected to an information system (6) for processing the data or information of at least one delivery service (7-10) and generates or makes available shipping data for the franking machine (3), wherein the franking machine (3) comprises means for preparing documents which accompany a shipping order and an information-receiving and processing site, wherein the franking machine (3) is connected to the delivery service (7-10) and constructed to carry out a shipping order of the delivery service (7-10), the franking machine (3) which handles a shipping order is connected to the information system (6) and to the delivery service (7-10) by data transmission lines (13).

12. The system according to claim 11, wherein the franking machine (3) comprises means for optimizing times and rates for the goods to be shipped.

13. The system according to claim 11, wherein several franking machines (3) are connected to one information system (6) which is connected to delivery services (7-10).

* * * * *